United States Patent [19]
Waitz et al.

[11] Patent Number: 5,636,631
[45] Date of Patent: Jun. 10, 1997

[54] ULTRASONIC IMAGE DATA FORMATS

[75] Inventors: Aaron S. Waitz, Suffern, N.Y.; John E. Bono, Bellevue; Robert L. Lincoln, Jr., Redmond, both of Wash.; John H. Lowery, Oak Ridge, N.J.; Wayne L. Connell, Snohomish, Wash.; James R. Jacobson, Wharton, N.J.; Donn D. Franklin, Lake Stevens, Wash.; Richard D. Tabbutt, Woodinville, Wash.

[73] Assignee: Advanced Technology Laboratories, Inc., Bothell, Wash.

[21] Appl. No.: 881,911

[22] Filed: May 12, 1992

[51] Int. Cl.$^6$ ............................................. A61B 8/00
[52] U.S. Cl. ............................................. 128/660.01
[58] Field of Search ............................ 128/630, 653, 128/660.01, 660.07; 364/413.25; 382/4; 395/100, 114, 400, 924

[56] References Cited

U.S. PATENT DOCUMENTS

| | | | |
|---|---|---|---|
| 5,019,975 | 5/1991 | Mukai | 364/413.13 |
| 5,038,158 | 8/1991 | Ayers et al. | 346/153.1 |
| 5,068,808 | 11/1991 | Wake | 395/119 |
| 5,095,906 | 3/1992 | Ema | 128/653.1 |
| 5,140,518 | 8/1992 | Ema | 364/413.01 |
| 5,185,673 | 2/1993 | Sobol | 338/296 |
| 5,210,824 | 5/1993 | Putz et al. | 395/145 |
| 5,321,520 | 6/1994 | Inga et al. | 358/403 |
| 5,359,512 | 10/1994 | Nishihara | 364/413.01 |
| 5,361,202 | 11/1994 | Doue | 364/413.01 |
| 5,386,117 | 1/1995 | Piety et al. | 250/330 |
| 5,387,941 | 2/1995 | Montgomery et al. | 348/473 |
| 5,420,441 | 5/1995 | Newman et al. | 250/581 |
| 5,426,010 | 6/1995 | Morton | 430/22 |
| 5,454,371 | 10/1995 | Fenster et al. | 128/660.07 |
| 5,506,937 | 4/1996 | Ford et al. | 364/413.02 |

*Primary Examiner*—Francis Jaworski
*Attorney, Agent, or Firm*—W. Brinton Yorks, Jr.

[57] ABSTRACT

A format for ultrasonic image data storage is described that utilizes a standard data formatting system to provide information specific to ultrasonic images and, in particular, sequences of ultrasonic images. The format utilizes a technique of tagged data records with a unique tag that extends the standardized to ultrasonic image specific tages. On tag denotes a particular image in a sequence of images which is marked as the image which is representative of the sequence. Specific areas of an ultrasonic image which contain distinct types of data are tagged to identify the type of data in the area. The distinct types of data can be arranged in unique ranges of data values so that a particular data value will inherently identify the type of data to which the value relates. Blocks of image data comprising monochrome or color data can be tagged as to the data type, enabling luminance data or red, green and blue data to be alternatively represented in the data values and automatically processed accordingly. Another tag value identifies the preferred sequential direction in which a sequence of images is to be viewed when recalled and replayed.

7 Claims, 5 Drawing Sheets

ULTRASONIC IMAGE DATA FORMATS

This invention relates to the formatting of image data and information and, in particular, to the formatting of ultrasonic diagnostic image data.

There are a number of different diagnostic modalities which produce diagnostic images of the interior of the body. These modalities include nuclear medicine, computed tomography, magnetic resonance imaging, and ultrasound, among others. Traditionally the images from such instruments have been presented in x-ray film format, and the diagnosing physician has viewed them in the same manner as x-ray film such as on a light table.

However, advances in technology and in the practice of diagnostic medicine have led to unique changes for ultrasonic image diagnosis. These advances have made it possible to store a series of images or several series of images from a particular examination, and have enabled physicians to take advantage of the real time acquisition of a sequence of images, such as a sequence of images of a beating heart, to make diagnoses from such image sequences. In addition, image processors are now available such as the Imagevue™ workstation, available from Nova Microsonics of Mahwah, N.J., which are specifically designed to enable a physician to review such image sequences and make diagnoses from the workstation.

As is well known, the storage of image data in currently available data storage media requires a substantial amount of such media which is both expensive and limiting when it is desired to make stored images immediately available on an "on-line" basis. This is especially the case when a sequence of many images is being stored instead of just a single image. Accordingly it is desirable to provide techniques for the efficient management of such image data, and for the rapid and effective display of the image data.

In accordance with the principles of the present invention, an image data format is provided which is especially useful for the retention and display of sequences of ultrasonic images. In accordance with the inventive format the image data is retained with "tags", or bytes of data which describe specific characteristics of the image data. Some of these tags provide information particular to a specific image, whereas other tags provide characteristics applicable to a sequence of images. This obviates the need to restate a given tag for each image in the sequence.

When a sequence of images is stored, one tag marks a particular image of the sequence as that which is representative of the entire sequence. Such denotation enables the physician to readily identify the sequence from the tagged image, and several such denoted images may be simultaneously displayed and used to enable the physician to select from among several identified sequences.

Ultrasonic images can contain several kinds of diagnostic information in a single image. For instance, a single image may contain structural information (B-scan data) as well as a simultaneous ECG plot. In accordance with the principles of a further aspect of the present invention, these distinct areas of the image are tagged to identify the type of information they contain, which facilitates such techniques as specialized post processing and the simultaneous display of two or more of such images. As a further feature, the data values of the types of image information are separated into distinct ranges of data values. Thus, the value of a data word will inherently convey the type of information related by the data.

In accordance with the principles of a further aspect of the present invention, the data words of individual points, or pixels, in the image are tagged as comprising either monochrome information or color information. Thus a block of image data can be readily separated into those points which are to be reproduced in color and those points which are to be reproduced in monochrome. Such tagging also enables the separate encoding of the respective data values, such as three values (red, green, and blue) for color pixels and highly precise luminance values for reproduction as monochrome values.

In accordance with another aspect of the present invention, one of the tags indicates the direction in which the sequential images are to be displayed. For instance, the sequence of images could be displayed forward then backward and repetitively so, or the sequence could be displayed continually and repetitively in only the forward direction.

In the drawings:

FIG. 1 diagrammatically illustrates an ultrasound image data file structure organized in accordance with the principles of the present invention;

FIG. 2 diagrammatically illustrates the header block of the image data file structure of FIG. 1;

FIGS. 3a and 3b diagrammatically illustrate the tag records of an image data file structure in accordance with the principles of the present invention;

Figure 1:
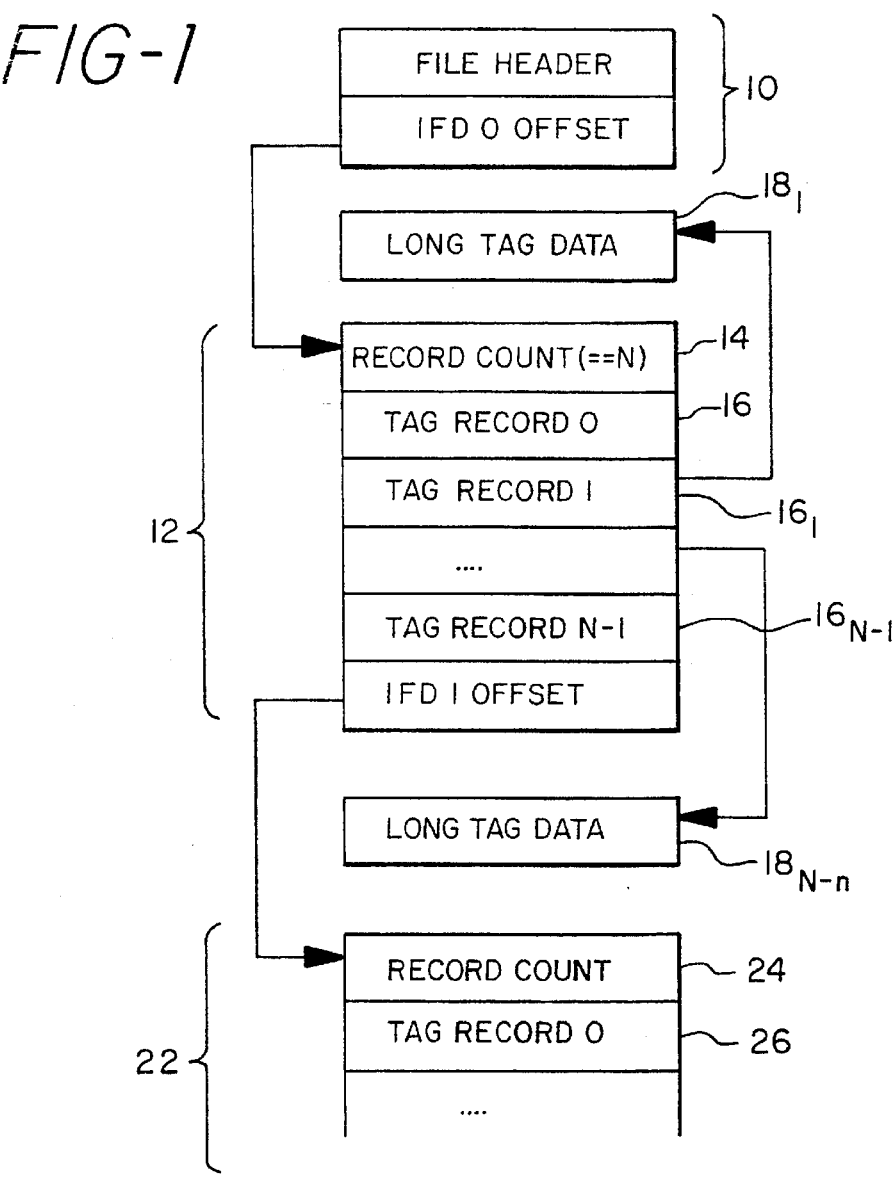

Referring first to FIG. 1 an ultrasound image data file structure organized in accordance with the principles of the present invention is diagrammatically shown. The illustrated file structure is designed to promote the compatibility of image files between various medical diagnostic imaging products and image processors, and in particular is designed to be compatible with the Tag Image File Format (TIFF) data structure which has been developed by the Aldus Corporation of Seattle, Wash. The TIFF format is a univeral image file structure for computerized image data of all sorts. The data structure of the present invention is specifically designed to be compatible with the TIFF format and to provide unique features for medical diagnostic image data and in particular to the storage, display and processing of ultrasonic image data sequences.

An image data file of the present invention begins with a file header 10 as shown in FIG. 1 which contains basic information about the file. The file header is followed by one or more image file directories (IFD's), each of which is associated with a particular diagnostic image frame. Two IFD's 12 and 22 are shown in FIG. 1. In this example IFD 12 is the directory for image frame 0, the first image frame in a sequence of frames. Correspondingly, IFD 22 is the directory for image frame 1, the second image frame in the sequence. Each IFD concludes with a four-byte file offset which points to the next IFD in the sequence. The final IFD concludes with a "null" offset pointer which indicates the end of the data file.

Each IFD begins with a two-byte data element indicating the number of records in the IFD. Two such record count elements 14 and 24 are shown in FIG. 1 for IFD's 12 and 22. Following the record count are the tag records indicated by the record count. Preferably the tag records are arranged in ascending or descending numerical order by tag identifier. Such ordering provides efficiencies in processing as the tag I.D. order can correlate with the sequence of functions performed by the image processor. As discussed below, each tag record provides specific information about the image frame associated with its IFD or about the entire sequence of images. Tag records may contain varying amounts of data concerning an image, and the data may be organized within a defined tag record length, or the tag record may be extended by a pointer to further data of the tag record. The extension technique is preferred for efficiency of data handling. If all tag records have the same length within the IFD, the processor can read the record count and skip forward immediately to the IFD offset pointer and the next IFD. In this manner the processor can quickly find any particular frame in a sequence of frames without the need to read through all the records in each IFD.

In the illustrated example IFD 12 contains a number of tag records denoted by reference numerals 16, $16_1$, and $16_{N-1}$. Similarly IFD 22 is seen to contain a tag record denoted by reference numeral 26. Two extensions of tag record data are illustrated at $18_1$ and $18_{N-n}$ with the long tag data $18_1$ being an extension of tag record 1, $16_1$.

Figure 2:
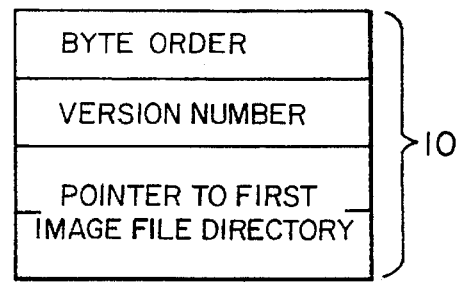

Referring to FIG. 2, a file header 10 is shown in greater detail. The first element of the file header 10 is two bytes of data which indicate the processor with which the data is compatible. For example, this element may indicate the byte order (low to high) for an Intel-type processor, or it may indicate the byte order (high to low) for a Motorola-type processor. The second element of the file header is two bytes of data which indicate the TIFF version with which the file is compatible. This establishes compatibility with TIFF file formats and equipment capable of reading TIFF data. The third element of the file header is four bytes of data which point to the storage location (offset) of the first image file directory, which is associated with the first image frame.

Figure 3A:
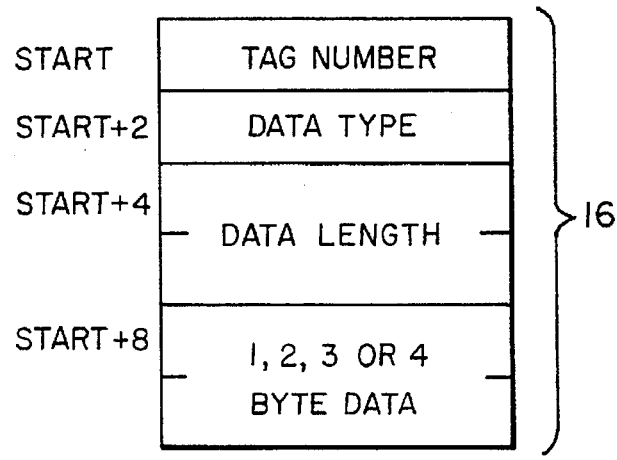

FIG. 3 illustrates the detailed organization of tag records in both the uniform length and extended formats discussed above. FIG. 3a shows a tag record which is twelve bytes in length. To the left of the illustration are the relative beginning storage locations of each element in the record, beginning with a starting location of "start." The tag record begins with a two-byte hexidecimal tag number that indicates the meaning of the tag. For example a tag number of 011A would mean that this is the "X resolution" tag which gives the number of pixels per horizontal inch in the image. A tag number of 011B is the "Y resolution" tag which gives the number of pixels per vertical inch in the image.

The next two bytes identify the form of the data contained in the tag record. For instance, the data could be identified as 8 bit bytes, or 8 bit character data, or 16 bit integer data, rational data, or 32 bit integer data, and so forth.

The next four bytes define the number of data items contained in the tag record. This number, in combination with the form of the data, specify the total data length of the tag record data in bytes. For example, if the data form is 16 bit integer (which is two 8 bit bytes) and the number of data items is eight, the total data length is two times eight, or 16 bytes.

Figure 3B:
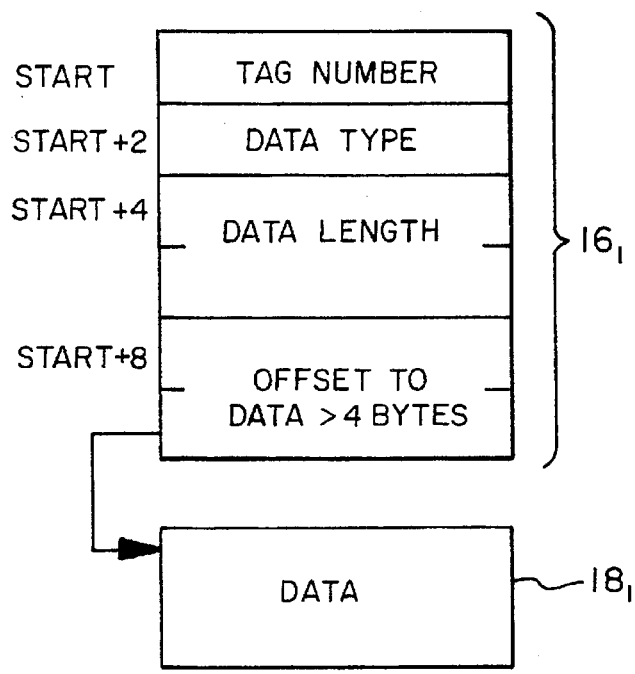

The final element of the tag record is one to four bytes of tag record data. If less than four bytes are needed for the record and uniformity of tag record length is to be preserved, the remaining bytes are padded with nulls (zeroes) to fill to the desired record length. If the tag record data is in excess of four bytes and uniformity of record length is desired, the preferred data format is as shown in FIG. 3b. In this illustration the tag record data element contains a four byte offset pointer to the starting location of the block of data for the tag record. There is in general no restriction as to where this data is actually stored. Preferably however it is between IFD's as shown in FIG. 1 to enable the data processor to quickly skip to a particular image frame as described above.

Figure 4:
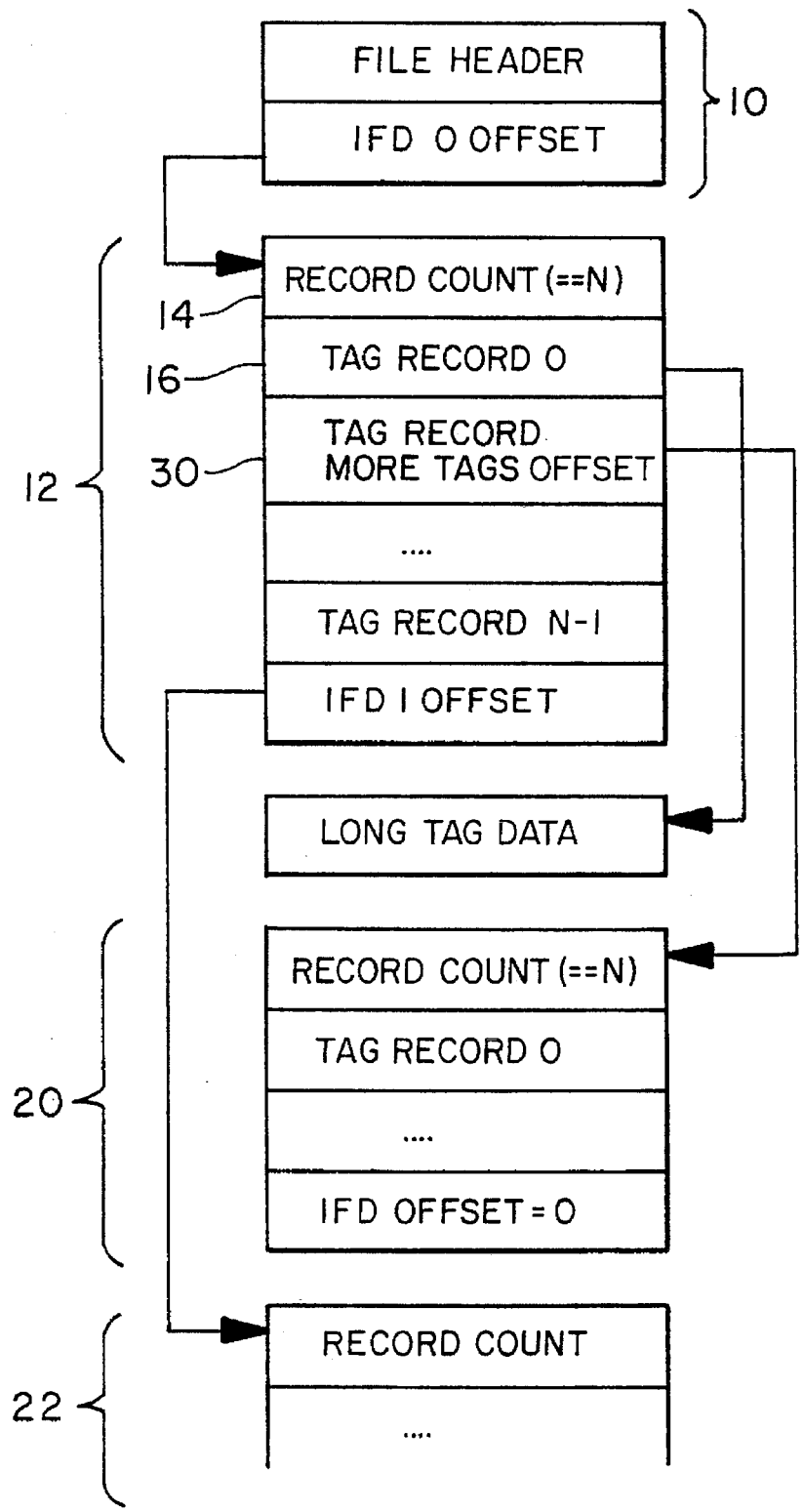
FIG. 4 illustrates a modification of the image data file structure of FIG. 1 to allow specialized additions to a standard image file format while assuring compatibility with image processors capable of reading only the standard format.

FIG. 4 illustrates a modification of the image file structure of FIG. 1 which advantageously allows specialized additions to a standard image file structure such as the TIFF format while assuring compatibility with image processors capable of reading only the standard structure. The difficulty in such an objective is that when the standard processor encounters a non-standard record it will alert the user to an error in the data format. The image file structure of FIG. 4 obviates such problems.

The file structure of FIG. 4 begins with the file header 10 including the offset pointer to the first IFD 12. The first IFD 12 is similar to that of the file structure of FIG. 1, with the addition of a special tag record 30 called "MoreTagsOffset." This special tag record is one that is recognized as a valid record by the standard format processor but to which the response of the standard processor is a passive one. Desirably, the standard processor recognizes the record as valid and simply continues on to the next tag record in the IFD 12. However, for a processor capable of responding to specialized tag records the response is different. The data of the MoreTagsOffset tag record is a pointer to a specialized IFD 20 which is in effect a subset of the standard IFD 12. The specialized tag processor will then skip to this IFD 20 and process its record count and specialized tag records, all of which are tag records which cannot be processed by the standard processor. At the end of the IFD 20 is a null offset marking the end of the specialized IFD, at which point the processor reverts to the tag record in the standard IFD which follows the MoreTagsOffset tag record. The processing of the remainder of the standard IFD and the other IFD's in the file continue as described above.

The image data file of the present invention is specially designed for efficient processing of sequences of related images, such as a sequence of images produced by a real time ultrasonic scanner. A technique of the present invention for creating such efficiency is to designate the scope of the various tags as being either frame specific or loop specific. A frame specific tag is one that provides information only as to the image frame with which its IFD is associated. A loop specific tag provides information applicable to all of the frames of the sequence. An example of a frame specific tag is the MoreTagsOffset tag described above. This tag is only used in an IFD of an image frame for which specialized tags are desired, and applies only to that frame. (It should be noted however that the frame specific MoreTagsOffset tag record could point to specialized tag records which are themselves applicable to the entire sequence.) An example of loop specific tags are the X and Y resolution tags mentioned previously. Since it is usually neither desirable or perhaps possible to change the resolution of a scanner during a specific sequence, these tags would provide resolution information applicable to all the images of the image sequence. It should be apparent that the desired location for loop specific tags is as a part of the initial IFD in the image data file. The loop specific tags, in effect, initialize the performance characteristics of the entire image sequence.

The preferred technique for designating tags as frame or loop specific is to make the characteristic inherent in the tag number. Thus by simply reading the tag number the processor will know that the tag information is applicable to either the specific frame or the entire sequence of images. Alternatively, a data byte within the tag record could identify the tag record data as either frame or loop specific and the processor would respond accordingly.

Figure 5:
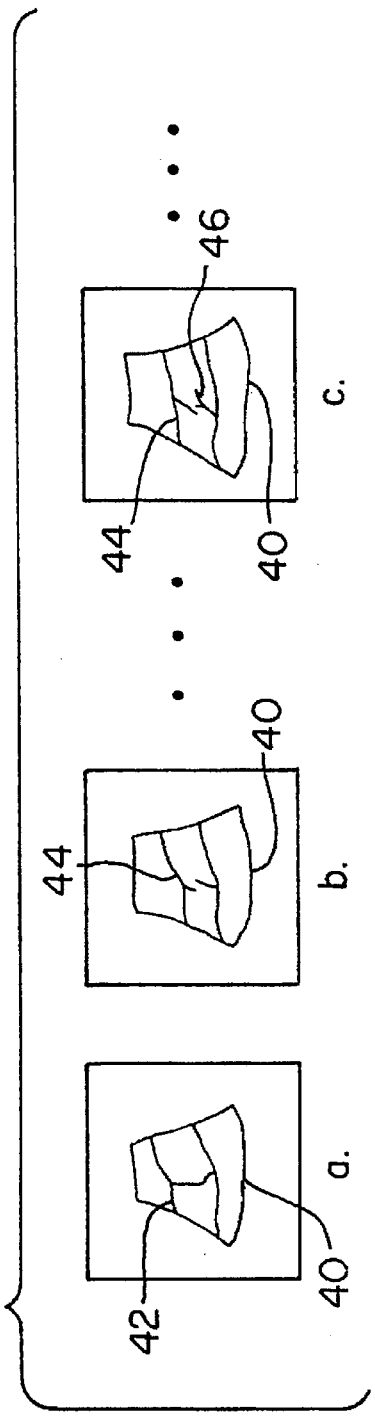
FIG. 5 illustrates a sequence of images with a representative image of the sequence.

One specialized tag record which is especially useful in processing or storing image sequences in accordance with the present invention is one which designates a "primary frame." Referring to FIG. 5, a sequence of diagnostic images is shown, three of which are designated as a, b, and c. The remaining image frames are indicated by the ellipses before and after frame c. The diagnostic image information is contained within a sector 40 of each frame. The diagnostic image sector shows a vessel or organ 42 of the body with a valve 44. In frame a the valve appears in a closed condition, and as the sequence progresses the valve begins to open. At one point in the operation of the valve, an unusual portion of pathology 46 appears as a part of the valve 44 as shown in frame c.

Under such circumstances the diagnosing physician may choose to mark frame c as that which best represents this sequence to the physician. That is, when the physician later sees only frame c, the physician will immediately recall the sequence and the patient. To mark frame c as the primary frame, the specialized tag record called "primary frame" is used as one of the tag records of the specialized IFD 20 of the first frame IFD 12. The data of this tag record is a byte or bytes of data which identify the frame number of the selected primary frame in the image sequence. For instance, if the frames in the sequence were numbered from zero to n and the primary frame was frame number seventeen, the data value of the primary frame tag record would be equal to seventeen, the number of the primary frame. Thus, without recalling the entire sequence but simply by recalling the primary frame the physician would be able to recall in his or her mind the diagnostic significance of the image sequence.

Figure 6:
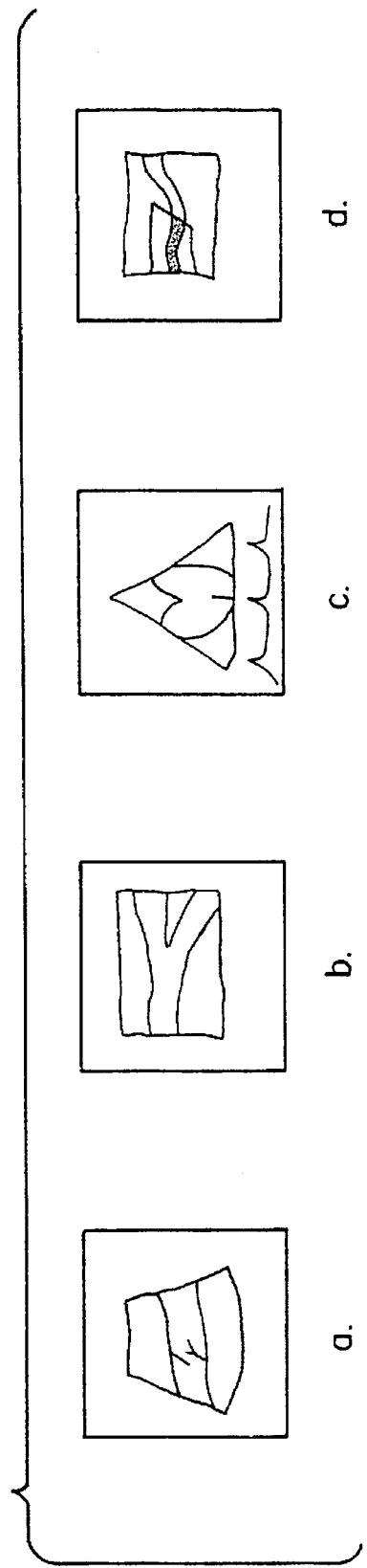
FIG. 6 illustrates a selection of sequence-representative images.

In accordance with the principles of the present invention a number of such primary frames are used by the image processor as a catalog of sequences from which the diagnosing physician may select. Referring to FIG. 6 four primary frames a through d are shown, each of which is from a different diagnostic image sequence. In this example each sequence is from a study of a different vessel or organ of the same patient. Suppose that the diagnosing physician wanted to review a particular sequence of one of the patient studies. The physician would then operate his image review workstation to recall all of the primary frames of the image sequences taken of the particular patient. The workstation would then display the four primary frames shown in FIG. 6 as a catalog of sequences from which the physician can select. Upon seeing the primary frames the physician would immediately spot the one which is representative of the particular sequence he has in mind. He would then select that primary frame, as by "clicking" his screen cursor on the desired image, and the workstation would immediately commence to play the desired real time sequence. Other uses of the displayed catalog of primary frames will occur to one skilled in the art.

Frames of ultrasonic diagnostic information will frequently contain numerous different types of information in a combination designed to provide the diagnosing physician with a comprehensive variety of information concerning a specific pathological condition. For instance, a single image frame may have areas which simultaneously display a B-mode (two dimensional structural) image, Doppler (fluid velocity) data, and M-mode (single dimensional structural motion as a function of time) data. These separate areas of an image frame are referred to herein as regions. Because it is frequently desirable to perform separate post processing on different types of information, the image data format of the present invention provides the capability of specifying different regions and unique parameters of each region. Generally the parametric information relates to scaling parameters of dimensions and time.

In accordance with the principles of the present invention, tags identified as Number of Regions, Region Area, and Region Scale are provided. All are loop specific tags. The data of the Number of Regions tag record defines the number of distinct information regions of the images in the sequence. In a preferred embodiment the number can be over a range of one to eight, with zero indicating that no region information is provided. If the data of the Number of Regions tag record is other than zero, the Region Area tag is employed. The data of this tag record defines the types of data found in the enumerated regions (B-mode, Doppler, M-mode, etc.) and the location of each region in terms of its X and Y coordinates and size. Other information such as the baseline and pulse rate frequency of Doppler regions may also be provided. In conjunction with this tag the Region Scale tag record is also provided. The data of this tag record specifies parameters such as the pixel scale of a region, the time scale of plots of information as a function of time, frequency scales, probe frequency, Doppler angle, speed of ultrasound and the like. With the benefit of the information of these tag records, multiregional images may be accurately reproduced and post processed in accordance with proper parameters.

Figure 7:
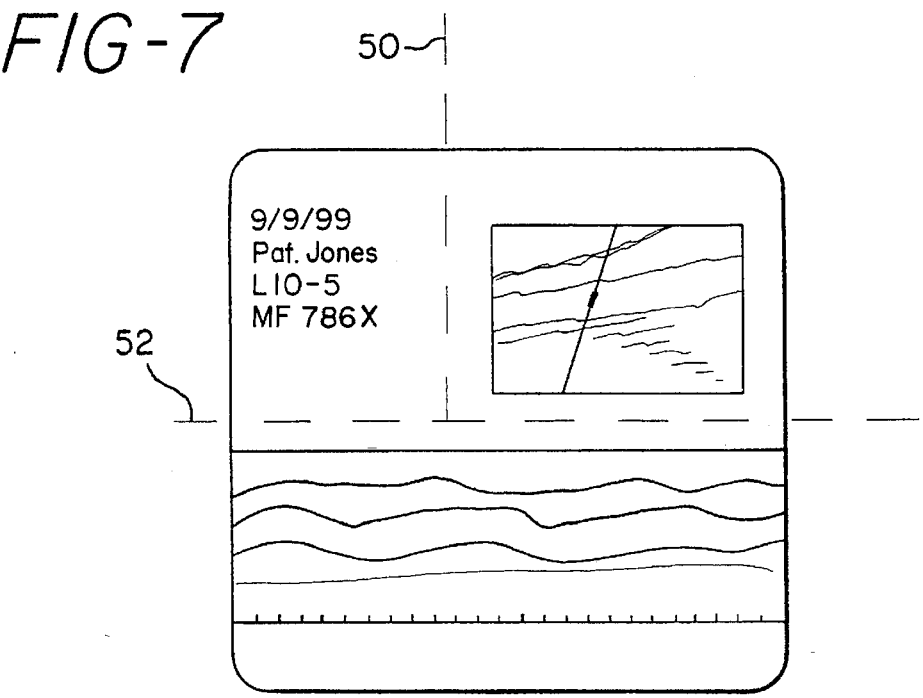
FIG. 7 illustrates an image which includes areas of three types of ultrasonic diagnostic information.
Figure 8:
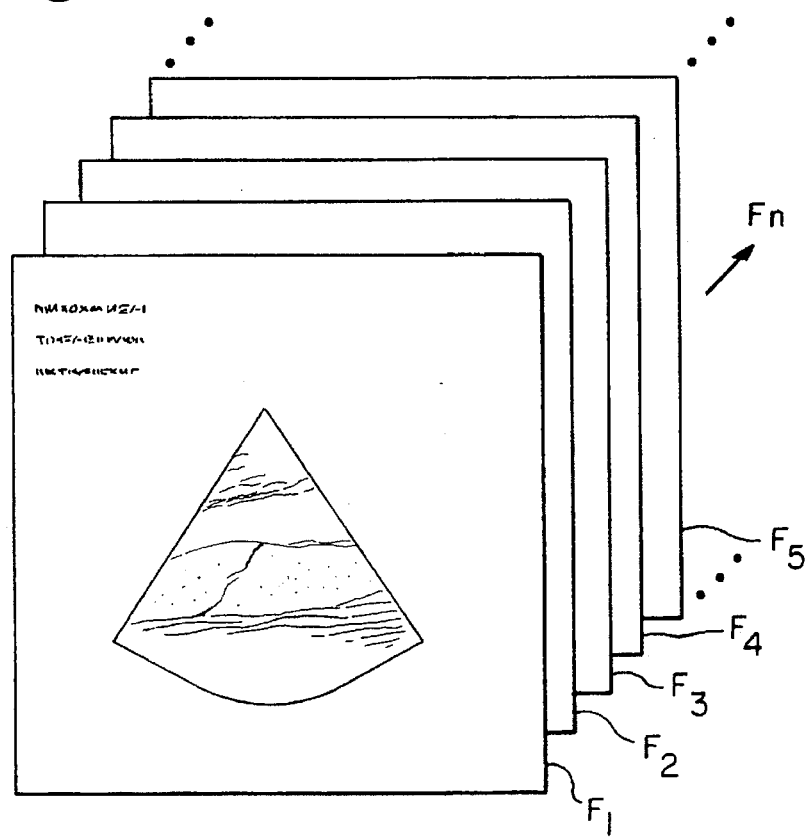
FIG. 8 illustrates a sequence of images which are intended to be viewed in chronological order.

An example of an image frame when the Number of Regions, Region Area, and Region Scale tag records would be of benefit is shown in FIG. 7. This figure shows a region of alphanumeric patient data in the upper left quadrant, a B-scan image with an M-mode cursor in the upper right quadrant, and a graphical M-mode trace as a function of time in the lower half of the image frame. The regions of the image may be figuratively defined as indicated by dashed lines 50 and 52, and the specific characteristics of each of the three regions and the information contained therein are specified by the data of Region Area and Region Scale tag records.

In accordance with a further aspect of the regional definition concept, the data ranges employed for each region are selected to inherently identify the type of information contained within the region. For example, suppose that a range of data values from 0000 to 01FF was sufficient to encompass the dynamic range of values of B-scan image data. Further suppose that M-mode data covered a dynamic range of values from 0000 to 00FF. In accordance with this aspect of the invention, B-scan data could be assigned a range of data values from 0000 to 01FF, and M-mode data could be assigned the next range of FF values, from 0200 to 02FF. Graphical, Doppler, and other types of data could be assigned successive ranges of values. Thus, under the conditions of the foregoing example the data value of 02A3 would be immediately identified as M-mode data by virtue of its data value. The value of a data word itself inherently conveys the type of information related by the data. In a preferred embodiment raw ultrasound data, that is, data which has been organized by scan conversion but has not been further analyzed or processed is range categorized in this manner. The range in which a particular data value is found would be used to identify the type of subsequent analysis or processing of the data value, for instance.

A convenient format for storing ultrasonic image data is in the form of pixel data, wherein each data value defines a display value for a particular pixel of a display. In the case of ultrasound image information, structural information is conventionally displayed in monochrome and fluid flow velocity information is displayed in color. Furthermore, the inventors have noted that it is often the case that ultrasound images comprise large areas of structure in monochrome and relatively smaller areas of color fluid flow. Accordingly, in accordance with a further aspect of the present invention, an efficient means of storing such image information is provided. The inventive technique is to designate one bit of an ultrasonic image pixel data word as a "tag" bit, which identifies the data word as that of either a luminance or chrominance pixel. If the tag bit identifies the data word as that of a chrominance pixel, the subsequent bits are arranged to provide color information. If the tag bit identifies the data word as that of a luminance (monochrome) pixel, the subsequent bits are arranged to provide luminance information. For instance, if the first bit of a sixteen bit image pixel data word is a "1", the word is identified as containing color information. The next fifteen bits are divided into three groups of five bits each. The first group provides a value for red, the second group a value for green, and the third group a value for blue. Thus, the data of the single pixel data word is identified and used to reproduce a pixel of the desired color and hue.

On the other hand, if the first bit of the sixteen bit word is a "0", the word is identified as containing luminance information. The next fifteen bits of the word define the luminance level to be displayed. This allows the display system to compact chrominance information if desired, and also to recognize the fact that the eye is able to perceive finer gradations in luminance than chrominance. The latter recognition in combination with the inventive data tagging technique ensures that a greater number of bits are used to record luminance information than the individual colors of a chrominance pixel. Furthermore, the technique enables the storage of one block of data for an ultrasound image in which the intermingling of both chrominance and luminance pixel is permitted and readily identified when the ultrasound image is to be reproduced on a display.

Another tag which is especially useful for real time diagnostic image sequences is a tag indicating the sequential direction in which the images are to be replayed for viewing. A physician may want to view a sequence of images of a moving organ such as the heart in one of several different ways. One way may be to view the sequence from beginning to end, then to continually repeat the sequence in the same direction from beginning to end. Alternatively thickening of the heart wall may be better discriminated by viewing an image sequence from the first image in the sequence to the last, then back from the last to the first. The sequence direction tag is stored with the image sequence as an indicator defining the manner in which the sequence is to be replayed when the sequence is recalled from storage. In a preferred embodiment the data of the sequence direction tag is a flag that can be set to a value of zero or one. If the flag is set to zero, the image sequence is of unknown image content and the default sequence for replay is only in the forward direction, that is, repetitively from beginning to end. If the flag is set to a value of one, the image sequence is to be displayed alternately and continuously from beginning to end and then from the end back to the beginning. Other replay information such as the rate of replay in frames per second could also be contained in the tag record data or separately stored in a separate tag record.

What is claimed is:

1. A method for the retention of a sequence of ultrasonic images for the subsequent display of said sequence as a real time image sequence comprising:

storing a plurality of diagnostic images, each of which corresponds to a particular image frame of a real time sequence of ultrasonic images; and assigning and storing one or more loop specific tags in association with said sequence for conveying information about the performance characteristics of the entire image sequence, whereby said sequence of image frames and tag records may be retrieved and said image frames displayed in real time with performance characteristics determined by said loop specific tag information.

2. A method for identifying an ultrasonic image sequence comprising:

enabling a user to identify a particular one of said images in said sequence as the image which is representative of a characteristic of the sequence, storing said sequence of images, and utilizing said identified image to represent or recall said image sequence.

3. The method of claim 2, further comprising:

identifying a plurality of said sequence-representative images from a respective plurality of sequences, simultaneously displaying said plurality of sequence-representative images, and recalling a particular sequence by selection of its representative image.

4. A method for organizing and storing ultrasonic diagnostic image data of image frames which include different types of diagnostic information comprising:

identifying different types of diagnostic information in an image frame; and identifying the respective areas of said image frame in which said different types of diagnostic information are located, and storing said image frame and, in association therewith, a data record of said identified different types of diagnostic information and areas.

5. The method of claim 4, wherein said storing step comprises:

storing said image frame information in digital form; and storing in association with said image frame information a data record identifying the types of diagnostic information contained in said image frame and identifying the regions of said image frame in which different types of diagnostic information are located.

6. The method of claim 5, wherein said step of storing in association with said image frame information comprises storing said different types of diagnostic information in different ranges of data values.

7. A method for defining the manner in which an ultrasonic image sequence is to be replayed when the sequence is recalled from storage comprising:

storing a plurality of groupings of diagnostic image data, each of which corresponds to a particular ultrasonic image frame of a sequence of such image frames; and setting a data record in association with one of said groupings identifying the sequential direction in which said image frames are to be displayed when recalled from storage, wherein said sequential direction may be repetitively from the first image in the sequence through the last, or repetitively from the first image in the sequence through the last then from the last image in the sequence through the first.

* * * * *